United States Patent [19]
Nilssen et al.

[11] 3,959,603
[45] May 25, 1976

[54] DUAL TONE MULTIPLE FREQUENCY RECEIVER/DECODER

[75] Inventors: Albert G. Nilssen, Cupertino; Burton R. Tunzi, Sunnyvale, both of Calif.

[73] Assignee: Tone Technology Corporation, Sunnyvale, Calif.

[22] Filed: Oct. 29, 1974

[21] Appl. No.: 518,370

[52] U.S. Cl. ............................................. 179/84 VF
[51] Int. Cl.² ......................................... H04M 1/50
[58] Field of Search .................... 179/84 VF, 2 DP; 324/78 D; 340/171 R; 328/28, 138

[56] References Cited
UNITED STATES PATENTS

| | | | |
|---|---|---|---|
| 3,537,001 | 10/1970 | Friend | 179/84 VF |
| 3,760,269 | 9/1973 | Beeman | 324/78 D |
| 3,784,758 | 1/1974 | McIntosh | 179/84 VF |
| 3,790,720 | 2/1974 | Schartmann | 179/84 VF |
| 3,882,283 | 5/1975 | Proudfoot | 179/84 VF |
| 3,912,869 | 10/1975 | Ullakko | 179/84 VF |

Primary Examiner—Kathleen H. Claffy
Assistant Examiner—Joseph Popek
Attorney, Agent, or Firm—Boone, Schatzel & Hamrick

[57] ABSTRACT

A method and apparatus for separating the two analog component signals which make up a dual tone multiple frequency (Touch Tone) signal, converting the component signals into digital identification signals representative of the component signals, and then recombining the identification signals and developing a digital output signal which corresponds to the particular input signal. The apparatus includes signal separating means for separating the input analog signal into its two component signals, frequency identification decoding means for identifying the two component signals and developing digital identification signals corresponding thereto, and digital logic means responsive to the identification signals and operative to develop particular one-of-sixteen digital output signals which correspond to the particular Touch Tone signal input to the system.

10 Claims, 6 Drawing Figures

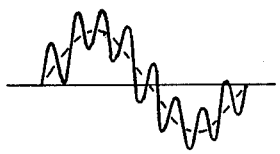
Fig_1
| INPUT ANALOG FREQUENCY $(f_{a_m} + f_{b_n})$ | | DIGITAL OUTPUT |
|---|---|---|
| LOW GROUP $f_{a_m}$ | HIGH GROUP $f_{b_n}$ | $D_{mn}$ |
| 697 | 1209 | 1 |
| 697 | 1336 | 2 |
| 697 | 1477 | 3 |
| 770 | 1209 | 4 |
| 770 | 1336 | 5 |
| 770 | 1477 | 6 |
| 852 | 1209 | 7 |
| 852 | 1336 | 8 |
| 852 | 1477 | 9 |
| 941 | 1336 | 0 |
| 941 | 1209 | * |
| 941 | 1477 | # |
| 697 | 1633 | A |
| 770 | 1633 | B |
| 852 | 1633 | C |
| 941 | 1633 | D |
Fig_2
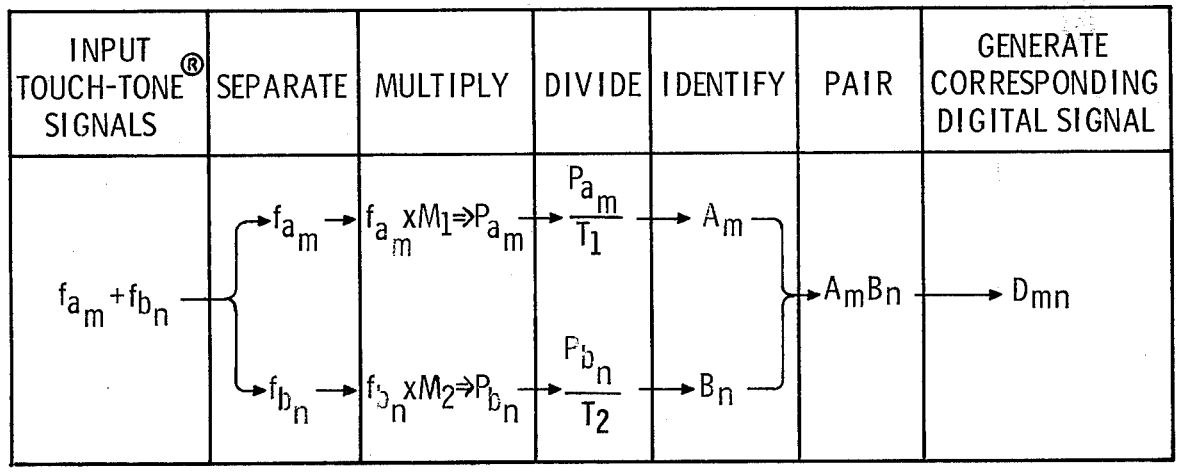
Fig_3

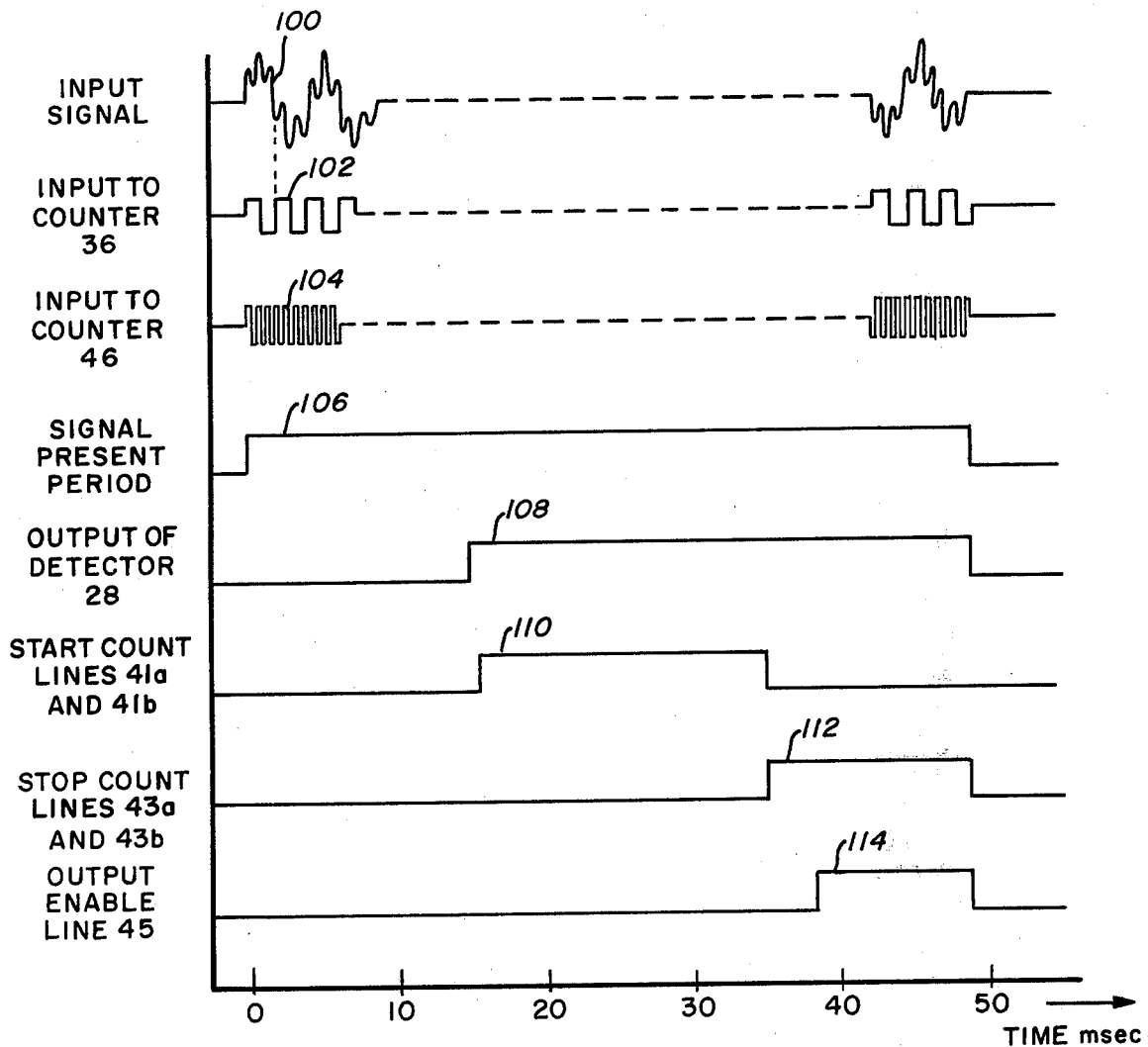
Fig_6

DUAL TONE MULTIPLE FREQUENCY RECEIVER/DECODER

BACKGROUND OF THE INVENTION

1. Field of the Invention

The present invention relates generally to analog-to-digital converting methods and apparatus, and more particularly to a method and receiver/decoder apparatus for converting standard "Touch-Tone" signals to digital signals which can be used in any of a large number of applications.

2. Description of the Prior Art

As the telephone industry changes over to the Touch-Tone dialing system, one of the problems which arises is the availability of apparatus capable of making full utilization of the signal transmission and handling benefits for which the Touch-Tone system was designed. Most prior art apparatus use analog techniques to perform the signal identification operations upon the analog signals received rather than converting such signals to digital form before decoding. As a consequence, such apparatus suffer disadvantages which make it impractical for portable applications. For example, presently available signal decoding apparatus operating in the analog domain are much too large in physical size and draw far too much electrical current to make them applicable for use in pocket-paging devices and other dial-signal responsive systems. Furthermore, such apparatus is expensive, relatively slow in operation and susceptible in jamming in ordinary use.

A related method and apparatus using digital techniques is disclosed in the U.S. Pat. No. 3,790,720 to Schartmann, entitled "Digital Decoder for Multiple Frequency Telephone Signalling."

SUMMARY OF THE INVENTION

A primary objective of the present invention is to provide a novel Touch-Tone data conversion method and apparatus which is less expensive, consumes less power, is more reliable and is faster in operation than prior art apparatus.

Another object of the present invention is to achieve the above-stated objective by using a novel technique to convert the analog Touch-Tone signals into the digital domain for utilization.

Briefly, the method of the present invention involves an initial separation of the two analog component signals which make up the Touch-Tone signal, the independent conversion of the component signals into digital identification signals representative of the component signals, and then the recombination of the digital identification signals to provide a digital output signal which corresponds to the particular input Touch-Tone signal. The presently preferred embodiment of the receiver/decoder apparatus includes signal separating means for separating the input analog signal into its two component frequencies, frequency identification decoding means for identifying the two component signals and developing digital identification signals corresponding thereto, and digital logic means responsive to the digital identification signals and operative to develop particular one-of-sixteen digital output signals which correspond to the particular Touch-Tone signals input to the system.

One advantage of the present invention is that since the decoding operations are performed in the digital domain, integrated logic circuitry can be used to accomplish signal identifying and converging functions, and as a result most of the prior art disadvantages can be readily overcome.

Other objects and advantages of the present invention will no doubt become apparent to those of ordinary skill in the art after having read the following detailed disclosure of the preferred embodiment which is disclosed in the several figures of the drawing.

IN THE DRAWING

FIG. 1 is a curve shown to illustrate the analog nature of a Touch-Tone signal;

FIG. 2 is a table showing the combinations of frequencies used in the Touch-Tone system, and the digital output signals corresponding thereto;

FIG. 3 is a diagram illustrating in simplified mathematical form the operational sequence of the present invention;

FIG. 6 is a timing diagram illustrating the major operative functions of the illustrated preferred embodiment.

DETAILED DESCRIPTION OF THE PREFERRED EMBODIMENT

Figure 4:
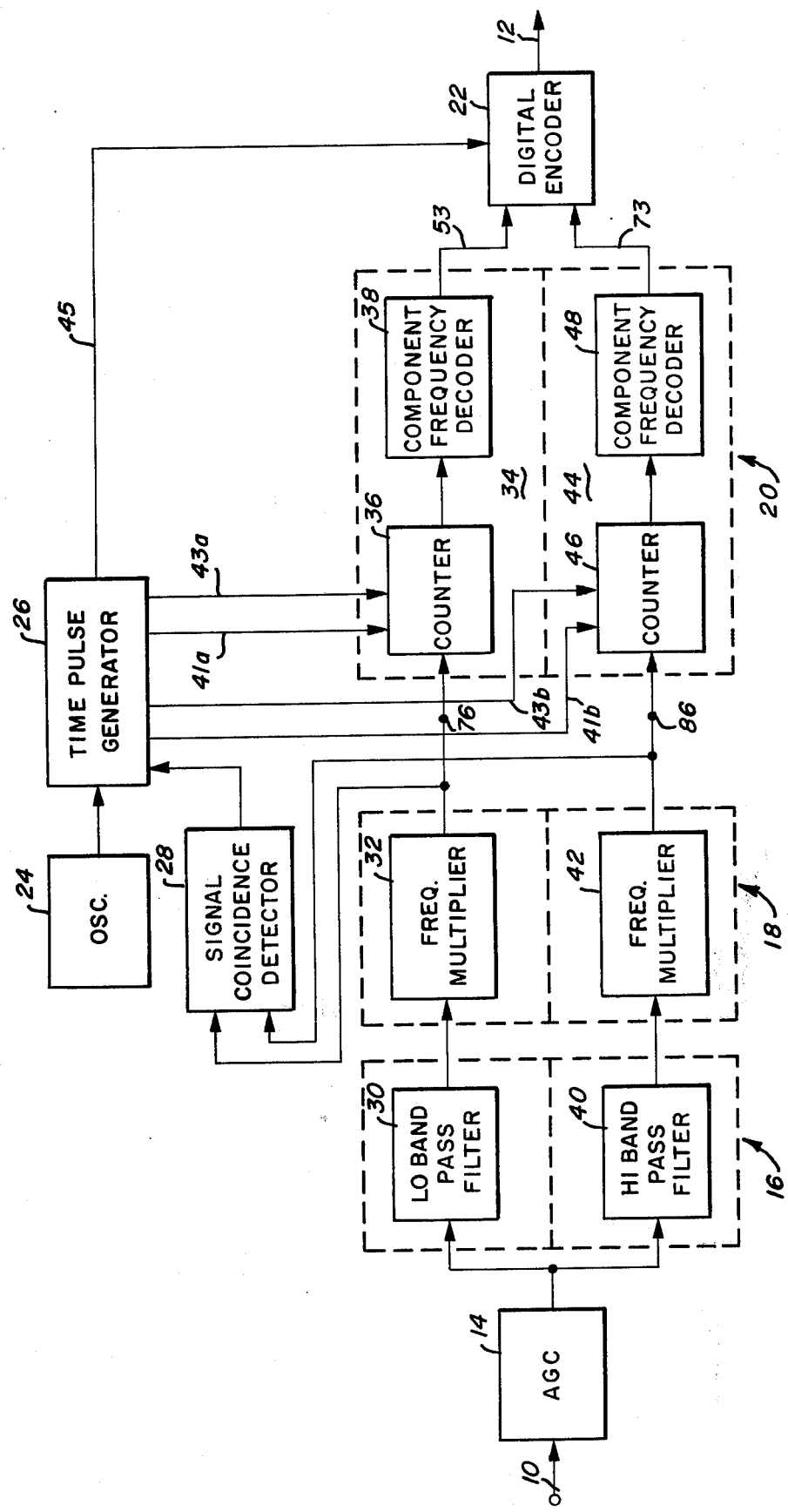
FIG. 4 is a block diagram schematically illustrating a presently preferred embodiment of a Touch-Tone receiver/decoder apparatus in accordance with the present invention.

As is well known to those familiar with the telephone art, the Touch-Tone signal is an electrical analog signal such as that illustrated in FIG. 1 which is comprised of the simple addition of two component signals in the form of sine waves of differing frequencies, each of which is selected from one of two groups of four discrete frequencies. The first, or low group of frequencies includes the frequencies 697Hz, 770Hz, 852Hz, and 941Hz. The second, or high group of frequencies includes the frequencies 1209Hz, 1336Hz, 1477Hz and 1633Hz. These particular frequencies are now a standard in the telephone industry. When used in the telephone system, a signal of one frequency of the high group is combined with a signal of one frequency of the low group and the particular combination is associated with one of 16 discrete digits. The 16 digits are typically used to identify the numbers 0 – 9, the symbols * and #, and A, B, C and D, but of course may be used to identify any other representative indicia. The various combinations of frequencies and their corresponding digital equivalents are illustrated in FIG. 2 of the drawing.

In FIG. 3 of the drawing, the method of Touch-Tone-to-digital (analog-to-digital) conversion of the present invention is illustrated by a simplified mathematical representation. In the first column, the input Touch-Tone signals are identified as being comprised of particular combinations of two component signal frequencies $f$, selected one each from two groups $a$ and $b$ of frequencies, with the particular frequency selected from group $a$ identified by the subscript $m$, and the particular frequency selected from group $b$ being identified by the subscript $n$. The first step in the method of the present invention is to separate the component signal of frequency $f_{a_m}$ from the component signal of frequency $f_{b_n}$. After separation, the two component signals are individually multiplied by factors $M_1$ and $M_2$ respectively, which may be either equal or unequal to each other, and then converted into trains of pulses $P_{a_m}$ and $P_{b_n}$ which respectively correspond cycle-for-cycle with the multiplied component frequencies $(f_{a_m} \times M_1)$ and $(f_{b_n} \times M_2)$.

The pulse trains $P_{a_m}$ and $P_{b_n}$ are thereafter divided by factors $T_1$ and $T_2$ respectively, which likewise may be equal or unequal to each other, with the quotient in each case providing a digital signal serving as a unique component frequency identification signal $A_m$ and $B_n$ respectively. The two component identification signals are then paired, as indicated, and a digital signal $D_{mn}$ corresponding to the particular pair $A_mB_n$ is generated.

The particular digital values of $A_m$ and $B_n$ have no significance other than the fact that they have been previously identified and associated with a particular component signal, and their combination has been previously identified and associated with a particular digital output signal which corresponds to the input Touch-Tone signal. The selectivity of the operation with respect to possible variations in the component frequencies of the input signals can be varied by appropriate selection of the multipliers M and/or divisors T. In other words, by either increasing the multiplier M or decreasing divisor T for given ranges of digital signals $A_m$ or $B_n$, input frequency selectivity can be improved.

Referring now to FIG. 4 of the drawing, a block diagram of a Touch-Tone-to-digital conversion apparatus in accordance with the present invention is shown. In the field, the apparatus is referred to generally as an analog-to-digital converter and more specifically, as a DTMF receiver-decoder. The principal function of the apparatus is to receive standard Touch-Tone signals at the input terminal 10 and provide corresponding digital 1-of-16 output signals at the output terminals 12.

The apparatus is comprised of an automatic gain-controlled input amplifier stage 14 having its input lead coupled to the system input terminal 10; signal separating means 16 for separating the two component frequencies from the input analog signal; signal multiplying means 18 for increasing the frequencies of the component signals; frequency identification (ID) decoding means 20 for identifying the two component signals and developing digital ID signals corresponding thereto; and digital logic means 22 for pairing the ID signals and developing a particular 1-of-16 digital output signal which corresponds to the analog signal input at terminal 10. In addition, the apparatus includes an oscillator 24 for developing a timing signal having a known, fixed frequency, a timing-pulse generator 26 which develops timing pulses for controlling the decoding means 20 and the logic means 22, and a signal coincidence detector 28 for actuating generator 26 when input signals are present at input terminal 10. Generator 26 also develops an ENABLE signal for causing logic means 22 to provide an output signal.

Functionally speaking, the apparatus forms two parallel signal paths; one for the low group signals and one for the high group signals. The divided paths begin at the output of AGC amplifier 14 and converge at the input to the digital logic means 22. The signal path for the low group includes a low group band pass filter 30, a frequency multiplier 32 and a frequency ID decoding unit 34. The decoding unit 34 is comprised of a counter 36 and a component frequency decoder 38. Likewise, the high group signal path includes a high group band pass filter 40, a frequency multiplier 42, and a frequency ID decoding unit 44 comprised of a counter 46 and a component frequency decoder 48.

Amplifier 14 is an AGC pre-amp device having a response band broad enough to cover the entire voice frequency spectrum. It is critical to the filters that follow that the input signals be of equal amplitude, plus or minus 1 or 2 dB. Amplifier 14 insures that this is the case through the use of an AGC loop that is capable of handling about a 40dB difference in signal levels.

The low group bandpass filter 30 is of a state of the art 4-stage active bandpass configuration with sharp cut-off on both ends. Such filters usually have relatively complex poles and typically include positive and negative feedback along with several passive networks to enhance the Q of the filter. It should perform with basically the same performance curves as a 16 pole filter and should need no gain adjustments because of the previously leveled input signals. The last output section of the filter is driven hard enough to clip the tops of the sinusoidal wafeforms and produce substantially square output waveforms for input to the multiplier 32 (see curves 102 and 104 in FIG. 6). The same holds true for the high group pass filter 40 except of course that that range of frequencies passed is different.

The 3dB point at the lower end of the bandpass characteristic of filter 30 should be at approximately 650Hz and the 3dB point at the upper end of the characteristic should be at approximately 1,000Hz. Similarly, the 3dB points of filter 40 should be at approximately 1,150Hz at the lower end of its characteristic and at approximately 1,700Hz at the upper end of its characteristic. The out of band characteristics of the two filters are such that all frequencies below 650Hz and above 1,700Hz are suppressed by a minimum of 35dB. The lowest of the high group frequencies and the highest of the low group frequencies have a cross-band isolation in excess of 36dB. In the preferred embodiment, the AGC and filter network operate over a range of about 5½ to roughly 25 volts DC.

The frequency multipliers 32 and 42 are MOS LSI devices utilizing pulse coincidence and subtraction procedures to double and square pulses received from the filters 30 and 40 so as to develop output signals having clean logic level changes at twice the frequencies of the input signal components. Signal coincidence detector 28 monitors the outputs developed by frequency multipliers 32 and 42, and when signal coincidence is detected, develops a gating signal for starting pulse generator 26. It has a built-in delay of approximately 15msec so as (1) to insure that the signals are not spurious signals; (2) to allow the signal amplitudes to stabilize; and (3) to insure that the signals are of sufficient amplitude to be useful input signals. In the preferred embodiment, ocsillator 24 is a 200KHz crystal oscillator.

Pulse generator 26 is a countdown device which responds to an input from detector 28 and uses the fixed frequency signal developed by the crystal oscillator 24 to develop a series of clock pulses that are divided down through a series of decade dividers. Following the 15msec delay (following the start of an input signal) effected by detector 28, generator 26 develops START COUNT signals on lines 41a and 41b, and then about 19msec to 20msec later develops STOP COUNT signals on lines 43a and 43b. This gives the option of different count periods for the low and high counters 36 and 46 for optimum signal detection. Generator 26 also develops an output ENABLE signal on line 45 which enables logic means 22 and causes it to output a digital signal at 12 which corresponds to the particular combination of the two signals applied thereto at 53 and 75, and which likewise corresponds to the input Touch-Tone signal.

As mentioned above, the frequency identification decoders 34 and 44 include counters 36 and 46, respectively, and 1-of-4 frequency decoders 38 and 48 respectively, which collectively accomplish the above-mentioned division operation by converting the number of pulses counted during the 19msec to 20msec count period into a digital frequency identification signal for input to the logic means 22 as will be explained in more detail below.

In the preferred embodiment, logic means 22 receives a 2-of-8 input at 53 and 73, and develops a 1-of-16 or BCD output in response to the two frequency identification signals developed by converters 38 and 48. The digital output signal developed at 12 corresponds to the particular input signal applied to input terminal 10 as will be explained more fully below.

Figure 5:
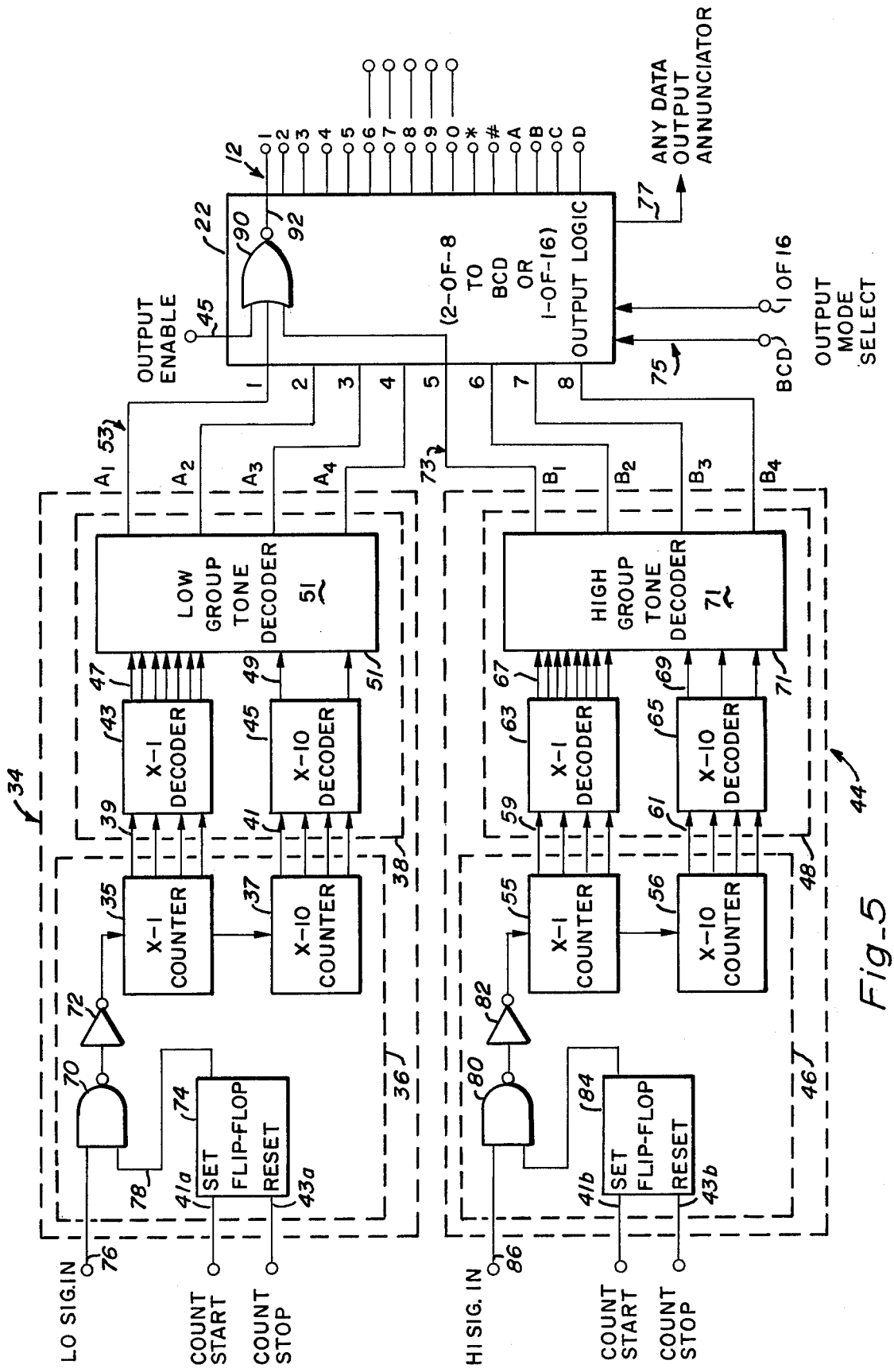
FIG. 5 is a block diagram further illustrating the decoding sections of the apparatus shown generally in the block diagram of FIG. 4.

Referring now to FIG. 5 of the drawing, the components of frequency ID decoding units 34 and 44 are shown in more detail. As illustrated, a NAND gate 70, an inverting amplifier 72, a set-reset flip-flop 74, the counter 36 and the decoder 38. One of the inputs 76 to NAND gate 70 receives the low group signal from multiplier 32 while the other input 78 is provided by flip-flop 74 in response to COUNT START signals applied at 41a and COUNT STOP signals applied at 43b. Counter 36 includes an X−1 counting means 35 and an X−10 counting means 37 which count the pulses allowed to pass through amplifier 72, and in response thereto develop binary-coded digital outputs on the respective sets four output leads 39 and 41.

Decoding means 38 includes an X−1 decoder 43, an X−10 decoder 45, and a low group tone decoder 51. Decoder 43 responds to the binary units count developed on lines 39 and raises the appropriate one of its 7 output lines 47 (in the preferred embodiment, only output lines 1, 2, 4, 5, 7, 8 and 9 are utilized). Similarly, decoder 45 responds to the binary tens count developed on lines 41 and raises the appropriate one of its 2 output lines 49 (in the preferred embodiment, only output lines 2 and 3 are utilized).

Low group tone decoder 51 contains logic which responds to the counts developed on lines 47 and 49, and raises one of the lines 53 to provide the low group identifying codes $A_1$–$A_4$. In the preferred embodiment, $A_1$ corresponds to a count of 28 or 29, $A_2$ corresponds to a count of 31 or 32, $A_3$ corresponds to a count of 34 or 35, and $A_4$ corresponds to a count of 37 or 38.

Frequency ID decoding unit 44 is likewise shown in simplified form to include a NAND gate 80, an inverting amplifier 82, a set-used flip-flop 84, the counter 46 and the decoder 48. One of the inputs 86 to NAND gate 80 receives the high group signal from multiplier 42, while the outer input 88 is developed by flip-flop 84 in response to COUNT START signals applied at 41b and COUNT STOP signals applied at 43b. Counting means 46 includes an X−1 counter 55 and an X−10 counter which count the pulses allowed to pass through amplifier 82 and develop binary-coded digital outputs on the respective sets of four output leads 59 and 61.

Decoding means 48 includes an X−1 decoder 63, and X−10 decoder 65, and a low group tone decoder 71. Decoder 63 responds to the binary units count developed on lines 59 and raises the appropriate one of its 8 output lines 67 (in the preferred embodiment, only output lines 2 through 9 are utilized). Similarly, decoder 65 responds to the binary tens count developed on lines 61 and raises the appropriate one of its 3 output lines 69 (in the preferred embodiment, only output lines 4, 5 and 6 are utilized).

Low group tone decoder 71 contains logic which responds to the counts developed on lines 67 and 69, and raises one of the lines 73 to provide the low group identifying codes $B_1$–$B_4$. In the preferred embodiment $B_1$ corresponds to a count of 47, 48 or 49, $B_2$ corresponds to a count of 52, 53 or 54, $B_3$ corresponds to a count of 57, 58 or 59, and $B_4$ corresponds to a count of 63, 64, 65 or 66.

In the preferred embodiment, logic means 22 is a 2-of-8 to 1-of-16 or BCD binary converter essentially comprised of 16 NOR gates 90, each having one input connected to the ENABLE line 45 (from timing pulse generator 26), one input connected to one of the first four input terminals 1–4, i.e., the outputs $A_1$–$A_4$ of decoding means 38, and one output coupled to one of the second four input terminals 5–8, i.e., one of the outputs $B_1$–$B_4$ of decoding means 48. Logic means 22 has 16 parallel output terminals 92, each of which is coupled to the output of one of the NOR gates 90. The preferred embodiment also has the selective capability, by virtue of the output mode selected input 75, to cause BCD form of output signal to be developed on output lines 6–D. An additional feature is the "any data output" annunciator signal which is developed on line 77 when an outsignal is present.

When low group signals and high group signals appear on lines 76 and 86 respectively, and the COUNT START signals are input to flip-flop 74 and 84 through lines 41a and 41b, flip-flops will be SET causing the outputs of NAND gates 70 and 80 to follow the respective input signals, be inverted by amplifiers 72 and 82, and then be input to counters 36 and 46, respectively. Binary counts of the input low group pulses and input high group pulses are respectively developed on lines 39 and 41, and 59 and 61 until COUNT STOP signals are developed on lines 43a and 43b. The COUNT STOP signals cause flip-flops 74 and 84 to be RESET, thereby deactivating NAND gates 70 and 80, and interrupting the flow of input signal pulses to counters 36 and 46.

During the count period, decoders 38 and 48 follow the binary counts developed by the counters and at the end of the count period, raise one of the four output lines 53 corresponding to the input low tone and one of the output lines 73 corresponding to the input high tone. Since each of the lines out of decoders 51 and 71 are raised in response to a range of counts as indicated previously, it will be appreciated that the signal tolerances of the source and signal frequency shifts due to transmission characteristics will be accommodated. The count period, or periods, if the low and high group periods are different, is selected such that the respective counts uniquely identify one of the four possible low group signals and one of the four possible high group signals.

It will be appreciated that since the four frequencies in each group are different and serially ordered, a count period can easily be selected which yields a series of counts that are suitable for use in the manner described. It is only necessary that an adequate separation of the count exist between any two consecutive identifiers so as to avoid slight drift or timing errors. In one embodiment, slightly different count periods were used for the high and low band counts with the decoders 38 and 48 wired to produce the correct outputs. In another embodiment, a common count period was used for the high and low bands, and decoders 38 and 48 were reconnected to logic means 22 as needed to accomplish the same end.

Following the termination of the count period at 38msec into the input signal duration in the preferred embodiment, an ENABLE signal is developed by the timing generator 26, on line 45, which causes the particular gate 90 having its other two inputs raised high, to raise its output terminal 92 high, thereby developing a 1-of-16 digital output signal which uniquely identifies the particular input Touch-Tone signal. As indicated above, an alternate BCD output is also provided for selection as determined by the input to the Output Mode Select. The BCD output is used for easier interface to a digital machine and to reduce the number of interconnections.

In order to further explain operation of the present invention, additional reference may be made to FIG. 7 which is a timing diagram showing the relative timing of certain control signals developed within the system. Curve 100 is representative of an input Touch-Tone signal resembling that which might be input at terminal 10. As the signal passes through the signal separating means 16 and frequency multiplier 18, and the respective low and high group signals are separated and multiplied, the output signals seen at circuit nodes 76 and 86 might be represented by the curves 102 and 104 respectively. The duration of the signal coincidence period could accordingly be represented by curve 106. Since the output of detector 28 does not go high until 15msec after the signal period has commenced, the output of the signal coincidence detector 28 may be represented by the curve 108.

When the output of detector 28 goes high, it causes generator 26 to raise its control lines 41a and 41b, as indicated by curve 110, thereby causing counters 36 and 46 to commence counting and count for approximately 19msec in the preferred embodiment. At the end of the count period, generator 26 pulls lines 41a and 41b low and raises lines 43a and 43b, as indicated by curve 112, thereby terminating the count period. Shortly thereafter, at approximately 38msec into the signal present period, generator 36 will raise line 45, as indicated by curve 114, thereby causing the gate 90 having high group and low group signals raised to generate a digital output on the corresponding one of its output lines 12.

Although, for purposes of clarity, the present invention has been described in simplified terms, it will be appreciated that the actual embodiment is considerably more complex and includes many anciliary components which are not shown. Accordingly, it is intended that the present disclosure not be considered as limiting but rather as exemplary, and that the appended claims be interpreted as covering all embodiments, modifications and variations which fall within the true spirit and scope of the invention.

What is claimed is:

1. Analog-to-digital decoding apparatus comprising:
    input means for receiving an analog signal consisting of a first component of a frequency included in a first band of frequencies and a second component of a frequency included in a second band of frequencies;
    first band pass filter means coupled to said input means and having a pass band including said first band of frequencies, said first filter means being operative to separate said first component from said analog signal and to develop a first component signal having a frequency corresponding to that of said first component;
    second band pass filter means coupled to said input means and having a pass band including said second band of frequencies, said second filter means being operative to separate said second component from said analog signal and to develop a second component signal having a frequency corresponding to that of said second component;
    means for detecting coincidence of occurrence of said first and second component signals and operative to develop a coincidence signal corresponding thereto;
    pulse generating means responsive to said coincidence signal and operative to generate in sequence a start count signal, a stop count signal and an output enable signal, all having a predetermined time relationship;
    first frequency identification decoding means responsive to said start count and stop count signals and operative to receive said first component signal and to develop a first decoded signal corresponding to said first component;
    second frequency identification decoding means responsive to said start count and stop count signals and operative to receive said second component signal and to develop a second decoded signal corresponding to said second component; and
    logic means responsive to said output enable signal and operative to receive said first and second decoded signals and to develop a digital output signal corresponding to the particular combination thereof.

2. Analog-to-digital decoding apparatus as recited in claim 1 and further comprising first signal multiplying means coupled between said first filter means and said first decoding means and operative to increase the frequency of said first component signal to a frequency which is a multiple of the frequency of said first component.

3. Analog-to-digital decoding apparatus as recited in claim 1 wherein said first decoding means includes a first counting means responsive to said start count and stop count signals and operative to count the number of cycles of said first component signal occurring during the interval between said start count signal and said stop count signal and to develop a first binary signal representative thereof.

4. Analog-to-digital decoding apparatus as recited in claim 3 wherein said second decoding means includes a second counting means responsive to said start count and stop count signals and operative to count the number of cycles of said second component signal occurring during the interval between said start count signal and said stop count signal and to develop a second binary signal representative thereof.

5. Analog-to-digital decoding apparatus as recited in claim 4 wherein said analog signal consists of one-of-four particular first components added to one-of-four particular second components and wherein said first decoding means further includes a binary decoder responsive to said first binary signal and operative to develop said first decoded signal, said first decoded signal comprising a signal developed on one-of-four output lines each of which corresponds to one of said first components.

6. Analog-to-digital decoding apparatus as recited in claim 4 wherein said second decoding means further includes a binary decoder responsive to said second binary signal and operative to develop said second decoded signal, said second decoded signal comprising a signal developed on one-of-four output lines each of which corresponds to one of said second components.

7. Analog-to-digital decoding apparatus as recited in claim 6 wherein said logic means is comprised of a two-of-eight to one-of-sixteen logic circuit including sixteen logic gates each having a first input coupled to one of the four output lines of said first decoding means, a second input coupled to one of the four output lines of said second decoding means, a third input for receiving said output enable signal, and an output upon which said digital output signal is developed when a signal appears simultaneously on said first, second and third inputs.

8. Analog-to-digital decoding apparatus as recited in claim 6 wherein said logic means is comprised of a two-of-eight to binary coded digital logic circuit responsive to said output enable signal and operative to develop a binary coded digital output signal corresponding to the particular combination of said first decoded signal and said second decoded signal.

9. A method of decoding an analog signal, consisting of the sum of a first AC signal selected from a first group of predetermined AC signals and a second AC signal selected from a second group of predetermined AC signals, and developing a digital signal corresponding thereto, comprising the steps of:
  separating the first AC signal from the second AC signal;
  multiplying the frequency of said first AC signal;
  counting the number of cycles of the multiplied first AC signal occurring during a first period of time;
  developing a first digital signal corresponding to the number of cycles counted during said first period of time;
  counting the number of cycles of said second AC signal occurring during a second period of time;
  developing a second digital signal corresponding to the number of cycles counted during said second period of time; and
  developing a particular digital output signal previously designated as corresponding to the particular pair of said first and second digital signals.

10. A method of decoding an analog signal into a digital signal as recited in claim 9 and further comprising the step of multiplying the frequency of said second AC signal before the corresponding counting step is carried out.

* * * * *